(12) United States Patent
Weigl

(10) Patent No.: US 6,209,315 B1
(45) Date of Patent: Apr. 3, 2001

(54) METHOD AND DEVICE FOR EXHAUST GAS AFTER-TREATMENT IN AN INTERNAL COMBUSTION ENGINE EQUIPPED WITH AN SCR CATALYST

(75) Inventor: Manfred Weigl, Viehhausen (DE)

(73) Assignee: Siemens Akteingesellschaft, Munich (DE)

( * ) Notice: Subject to any disclaimer, the term of this patent is extended or adjusted under 35 U.S.C. 154(b) by 0 days.

(21) Appl. No.: 09/302,660

(22) Filed: Apr. 30, 1999

(30) Foreign Application Priority Data

Apr. 30, 1998 (DE) .............................................. 198 19 579

(51) Int. Cl.⁷ ....................................................... F01N 3/00
(52) U.S. Cl. ................................. 60/274; 60/286; 60/295; 60/303
(58) Field of Search .............................. 60/286, 303, 274, 60/295, 301

(56) References Cited

U.S. PATENT DOCUMENTS

| | | | |
|---|---|---|---|
| 5,586,433 | * | 12/1996 | Boegner et al. ........................ 60/274 |
| 5,665,318 | * | 9/1997 | Rembold et al. ..................... 422/177 |
| 5,709,080 | * | 1/1998 | Arora et al. ............................. 60/274 |
| 5,845,487 | * | 10/1998 | Fraenkle et al. ........................ 60/274 |
| 6,026,641 | * | 2/2000 | Liberty ................................... 60/314 |
| 6,041,594 | * | 3/2000 | Brenner et al. ......................... 60/309 |

FOREIGN PATENT DOCUMENTS 297 08 591 U1  8/1997 (DE) .

* cited by examiner

Primary Examiner—Thomas Denion
Assistant Examiner—Binh Tran
(74) Attorney, Agent, or Firm—Herbert L. Lerner; Laurence A. Greenberg; Werner H. Stemer

(57) ABSTRACT

An internal combustion engine operated with excess air has an exhaust gas after-treatment device wherein nitrogen oxides in the exhaust gas are reduced by selective catalytic reduction. A pump is connected between a reducing agent container and a metering device for controlled feeding of a reducing agent to the exhaust gas upstream of an SCR catalyst. A pressure accumulator with an associated pressure sensor for intermediately storing the reducing agent is connected between the pump and the metering device. The pump delivers only so much reducing agent into the pressure accumulator as is being used in the exhaust gas after-treatment.

14 Claims, 2 Drawing Sheets

METHOD AND DEVICE FOR EXHAUST GAS AFTER-TREATMENT IN AN INTERNAL COMBUSTION ENGINE EQUIPPED WITH AN SCR CATALYST

BACKGROUND OF THE INVENTION

Field of the Invention

The invention lies in the automotive technology field. Specifically, the invention relates to an exhaust gas after-treatment process and device for an internal combustion engine equipped with an SCR catalyst. The system is applicable to internal combustion engines operating with excess air, in particular diesel internal combustion engines, using the selective catalytic reduction of nitrogen oxides from the exhaust gas. A reducing agent is delivered from a reducing agent container by a pump and, for specific operating states of the internal combustion engine, is apportioned to the exhaust gas of the internal combustion engine upstream of an SCR catalyst via a metering device.

Nitrogen oxide emissions from an internal combustion engine operating with excess air, in particular a diesel internal combustion engine, can be reduced with the aid of selective catalytic reduction (SCR) technology to form atmospheric nitrogen ($N_2$) and water vapor ($H_2O$). The reducing agent used is either ammonia gas ($NH_3$), ammonia in aqueous solution, or urea in aqueous solution. The urea is used in this case as an ammonia carrier and is injected with the aid of a metering system upstream of a hydrolysis catalyst into the exhaust system, and converted there by means of hydrolysis into ammonia which then in turn reduces the nitrogen oxides in the actual SCR or $DeNO_x$ catalyst.

In prior art metering systems, pumps produce the required injection pressure. The pressure is maintained constant by a pressure regulator. In order to meter the reducing agent, electromagnetically actuated valves, as are known for fuel injection, are used. The quantities of reducing agent to be metered in proportion to the distance traveled correspond to a few percent of the relevant quantity of fuel. In other words, the amounts to be delivered by the pump are relatively small. In known metering systems, the electrically driven pump delivers the reducing agent via a pressure regulator in the loop. Using these pumps for the necessary pressure range, many times the required quantity of reducing agent is delivered, and available pressure regulators require, in order to function according to specification, delivered quantities which are many times the metered quantity. The pressure regulator limits the pressure to a constant value, so that the metered quantity can be controlled through a valve opening time dictated by a control device. A reducing agent circuit of this type has the disadvantage that the continuously running pump consumes an unnecessarily large amount of drive energy and must be designed for long life.

Further, in urea SCR systems of this type, it is necessary to monitor the metered quantities of reducing agent since, on the one hand, conventional gas sensors are too inaccurate to reliably record metering errors and, on the other hand, the storage capacity of the catalyst would delay the detection of an error in metering based solely on exhaust gas measurement. In a continuously running pump which provides a constant pressure by virtue of a pressure regulator, the metered quantity cannot be measured, since the quantity flowing through the pressure regulator back to the storage container for the reducing agent is many times the metered quantity. A further problem with such metering devices consists in the fact that the metering accuracy of available cost-effective solenoid valves decreases, as the drive times become small, to such an extent that it is not possible to meter with enough resolution in particular operating states.

German utility model DE 297 08 591 U1 discloses a device for feeding ammonia to the exhaust gas flow of a combustion engine. There, a heatable pressure-proof converter, which contains a thermolytically ammonia-releasing substance, or a thermolytically ammonia-releasing mixture of substances, is used as the ammonia source. An ammonia accumulator for intermediate storage of ammonia released from the material by supplying heat is connected upstream of the metering device for the ammonia. The metering device receives control signals from a control unit which processes the data characteristic of the running of the engine, from which it determines the $NO_x$ emission.

2.Summary of the Invention

It is accordingly an object of the invention to provide an exhaust gas after-treatment process and device for an internal combustion engine equipped with an SCR catalyst, which overcomes the above-mentioned disadvantages of the heretofore-known devices and methods of this general type and which allows metering small quantities of reducing agent and, at the same time, presents an opportunity to check the metering system in terms of its functional integrity.

With the foregoing and other objects in view there is provided, in accordance with the invention, a method of after-treating exhaust gas of an internal combustion engine operating with excess air, in particular a diesel engine, wherein nitrogen oxides in the exhaust gas are reduced by selective catalytic reduction. The method comprises the following steps:

pumping a reducing agent from a reducing agent container into a pressure accumulator;

delivering, during specific operating states of an internal combustion engine, quantities of the reducing agent to an exhaust gas of the internal combustion engine upstream of an SCR catalyst, by opening a metering device and taking a quantity of reducing agent currently required for exhaust gas after-treatment from the pressure accumulator; and wherein the pumping step comprises delivering only a quantity of the reducing agent required by the metering to the pressure accumulator.

In accordance with an added feature of the invention, a pressure in the pressure accumulator is determined with a pressure sensor and a metered amount of reducing agent is deduced from a pressure difference before and after a respective metering phase.

In accordance with an additional feature of the invention, the metered amount of reducing agent is evaluated from a characteristic curve in dependence on the measured pressure values. In a preferred embodiment, the characteristic curve is stored in a memory of a control unit for exhaust gas after-treatment.

In accordance with another feature of the invention, the metering system is checked for leaktightness during pauses between metering in which no reducing agent is added.

In accordance with a further feature of the invention, after an end of a metering pulse, a pressure is measured in the pressure accumulator, and, after a predetermined period of time has elapsed, it is determined whether the pressure in the pressure accumulator has fallen below a predetermined limit value, and if the pressure has fallen below the limit value, the metering system is classified as not being leaktight.

In accordance with again an added feature of the invention, a pressure in the pressure accumulator is sensed with a pressure sensor, and, when the pressure falls below a lower pressure threshold value, the pump is turned on, and when the pressure exceeds an upper pressure threshold value, the pump is turned off.

In accordance with again an additional feature of the invention, a drive time of the pump is measured during which the pressure lies between the lower and upper pressure threshold values and the drive time is used as a criterion for a functionality of the pump.

In accordance with again another feature of the invention, a charging and discharging time of the pressure accumulator is measured and the charging and discharging time is used as a criterion for the functionality of the pressure accumulator.

In accordance with a preferred embodiment of the invention, the pressure accumulator used in the method is a flexible line connecting the pump to the metering device.

With the above and other objects in view there is provided, in accordance with the invention, an exhaust gas after-treatment device for an internal combustion engine operating with excess air, in particular a diesel engine, wherein nitrogen oxides in the exhaust gas are reduced by selective catalytic reduction. The novel device comprises:
- a reducing agent container;
- a metering device for controlled feeding of a reducing agent to an exhaust gas of an internal combustion engine upstream of an SCR catalyst in an exhaust gas flow direction;
- a pump communicating with the reducing agent container for pumping reducing agent from the reducing agent container; and
- a pressure accumulator in form of a flexible line connected between the pump and the metering device for intermediately storing the reducing agent, and a pressure sensor operatively associated with the pressure accumulator.

In other words, the novel system includes the following main components: control unit, pump, pressure accumulator, pressure sensor and metering valve. The pump is turned on by the control computer and delivers reducing agent into a pressure accumulator. By opening the metering valve, it is possible to inject the reducing agent into the exhaust of the internal combustion engine. According to the invention, the pump delivers in this case only as much reducing agent solution as is used up for the exhaust gas after-treatment. This results, on the one hand, in very short pump drive times, which considerably simplifies the design of the pump motor in terms of heating and, on the other hand, in very short total operating times, that is to say reduced requirements in terms of service life. In addition to the savings in the pump design, the weight of the system is also reduced by the omission of the pressure regulator, and the electrical power consumption is reduced.

From the pressure drop during and after a metering phase, it is possible to evaluate the quantity of reducing agent metered. Inaccuracies in the valve drive or in the valve throughput do not therefore affect the metering accuracy. If the pressure falls below a predetermined minimum pressure, the pump is restarted and the pressure is built up again. The quantity of reducing agent metered may advantageously, if appropriate sensors are present, also be evaluated from the displacement of a pressure accumulator diaphragm or the number of displacements with a predetermined volume.

Because of the capacity for storing the reducing agent in the SCR catalyst, metering pulses may be dispensed with during the pressure build-up phase in order not to impair the accuracy of the quantitative calculation for the reducing agent. Through this pumping and metering strategy, sufficiently accurate metering of the reducing agent can be achieved without additional sensors.

Since the quantity of reducing agent metered is determined through the pressure accumulator, the metering valve can be operated with very short drive pulses and at a high frequency, without entailing disadvantages in the accuracy of the metering.

The system according to the invention also offers extensive self-diagnosis features. By measuring the charging time of the pressure accumulator or the rate at which the pressure rises, changes in the pump characteristics can be detected. In the metering phase, by comparing the cumulative valve drive times with the pressure decrease or the pressure accumulator displacements, changes in the functioning of the valve can be detected. By checking the charging and discharging times, errors in the functioning of the pressure accumulator can be ascertained. These types of errors include, on the one hand, changes in the spring constant due to the spring breaking in sprung diaphragms or pistons or, on the other hand, loss of gas if a diaphragm supported by a gas volume is used. Further, changes in the storage capacity due to deformation of the diaphragm or impeded pistons can be detected. If neither the pump nor the metering valve are being driven, the pressure in the system must remain constant. A drop in pressure indicates a leak in the system. The errors picked up may be stored in an error memory and/or communicated to the driver acoustically or optically.

Without loss of metering accuracy, the system allows choice of the injection pressure level. For optimum distribution of the reducing agent in the exhaust gas, the injection profile of the metering valve can be matched to the engine operating states (speed, load, exhaust gas back pressure) by varying the pressure.

The quantity that is metered in is defined no longer through the valve opening time but through the pressure profile or the number or magnitude of the pressure accumulator displacements. In this case, use is made of the fact that, in the case of a urea SCR system, it is not the quantity per metering pulse but only the integral envelope or profile which needs to be precise. The metering pulses do not, in contrast to fuel metering, need to be synchronized with the crankshaft, i.e. the accumulator charging phase in which metering should not be carried out, for example in order not to lose accuracy, does not place any restriction on the functionality of the system.

Other features which are considered as characteristic for the invention are set forth in the appended claims.

Although the invention is illustrated and described herein as embodied in an exhaust gas after-treatment process and device for an internal combustion engine equipped with an SCR catalyst, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
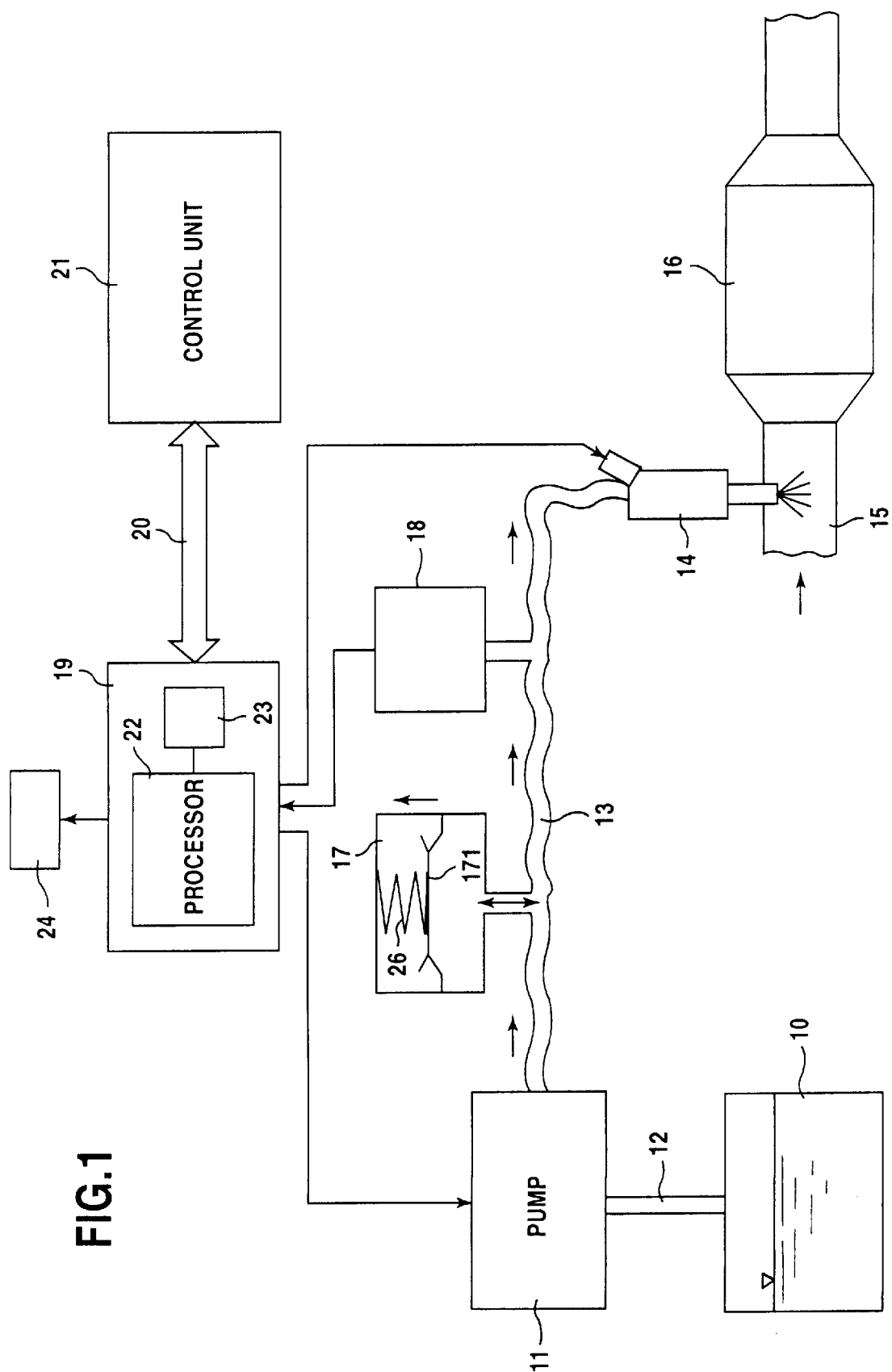
FIG. 1 is a block diagram of a first exemplary embodiment of an $NO_x$ reduction system with a pressure accumulator and a separate pump.

It will be understood by those of skill in the pertinent art that the two block diagrams of the $NO_x$ reduction systems in the drawing include only those components which are necessary for an understanding of the invention. In particular, in both cases, the heating device with associated temperature sensors, as well as the device for measuring the filling level, have been omitted in relation to the reducing agent container.

Referring now FIG. 1 in detail there is seen a reducing agent container 10 from which reducing agent, for example urea dissolved in water, is delivered by means of an electrically driven reducing agent pump, referred to below as pump 11 for the sake of simplicity. The intake side of the pump 11 is connected via a delivery line 12 to the reducing agent container 10. From the output side of the pump 11, a feedline 13 leads to a metering valve 14. The metering valve 14 is arranged in an exhaust pipe 15, upstream of an SCR catalyst 16 in the exhaust gas flow direction (indicated by the arrows). The nozzle opening of the metering valve 14 protrudes into the exhaust pipe 15.

The feedline 13 contains a pressure accumulator 17 which, for example, has a sprung diaphragm 171. Further, a pressure sensor 18 is arranged in the feedline 13, downstream of the pressure accumulator 17 as viewed in the direction in which the reducing agent is delivered. The pressure sensor 18, the pump 11 and the metering valve 14 are respectively connected, via electrical lines (not indicated in further detail) to a control unit 19 which controls the addition of the reducing agent to the exhaust 15. For this purpose, the control unit 19 has an electronic computer unit 22 or processor 22 which also performs error detection and diagnostic routines.

The control unit 19 is connected via a serial interface 20 (for example a CAN BUS) to a control unit 21 of the internal combustion engine and/or to other control units. Via this interface, data such as, for example, engine speed, control movement and boost air temperature are transmitted to the control unit 19. Further, the control unit 19 contains various functional units for driving the actuators (reducing agent heater, pump) and for evaluating the signals delivered by the sensors (filling level sensor, temperature of the reducing agent, pressure in the pressure accumulator or in the feedline). For this purpose, the control unit 19 has, amongst other things, a memory 23 which stores a plurality of characteristic curves or characteristics, as well as threshold values, whose significance will be explained in more detail.

In the first illustrative embodiment, the pressure accumulator 17 and the pump 11 form separate functional units, although these may also be combined with the pressure sensor 18 to form a single module in order to decrease the costs for the housing parts and lines and to reduce the assembly outlay.

It is also possible to integrate the functions of the control unit 19 for the reducing agent metering system into the control unit 21 of the internal combustion engine.

The functional operation of the system is as follows: After the pump 11 has been triggered using appropriate drive signals from the control unit 19, reducing agent is delivered from the reducing agent container 10 and pumped into the pressure accumulator 17 and into the feedline 13. The sprung (spring-loaded) diaphragm 171 of the pressure accumulator 17 is deflected in the direction denoted by an arrow symbol, against the force of a spring 26. Using the pressure sensor 18, the pressure is measured and compared with an upper threshold value stored in the memory 23. If the currently measured pressure value exceeds the predetermined threshold value (for example 2–5 bar), then the pump 11 is turned off. If, because of a plurality of brief injection pulses for the metering valve 14, the pressure falls below a predetermined lower threshold value, then the pump 11 is turned on again. The required drive time of the pump 11 is measured in order to detect errors (for example inadequate pump power) in the pressure system.

Both the lower and the upper threshold values for the pressure can be freely set by the computer unit 22 of the control unit 19, that is to say optimally adjusted for the respective state of the internal combustion engine or the instantaneous exhaust gas temperature.

In the first illustrative embodiment, the quantity of reducing agent metered may advantageously be determined using a characteristic curve for the pressure accumulator volume as a function of the pressure. For this purpose, the pressure is measured by means of the pressure sensor 18 before and after a series of metering pulses.

Through simple table access, the volume difference, that is to say the metered quantity of reducing agent, can then be determined. For this purpose, the memory 23 stores a characteristic curve which represents the relationship between pressure and pressure accumulator volume. The input variable is in this case the pressure recorded by the pressure sensor 18. If the memory 23 of the control unit 19 also stores a characteristic curve for the throughput of the metering valve as a function of pressure, the metering valve can be checked for the correct throughput. In pauses between metering, for example if the exhaust gas temperature is too low and consequently no reducing agent is being added, the system can be checked for leaktightness. To do this, the pressure directly after the end of a metering pulse is recorded and, after a particular time has elapsed, a check is made as to whether the pressure has fallen below a predetermined limit value. If this is the case, it is concluded that there is a sealing fault in the metering system. This may be due to a leak in the reducing agent container, the lines or the pressure accumulator, or because the metering valve no longer closes fully, so that there is a residual flow. The result of the diagnosis may be communicated to the driver of the motor vehicle equipped with the internal combustion engine acoustically and/or optically by means of a display device 24 which is activated by corresponding signals from the control unit 19. A further option is to enter the error in an error memory and/or make changes to the control routines of the internal combustion engine, so that the emissions remain below a limit value even in the event of a fault.

In a simplified embodiment, the pressure accumulator 17, represented as a separate component in FIG. 1, may be produced as a flexible line taking the place of feedline 13, in particular in the form of a hose (flexibly expandable hose), which connects the output side of the pump 11 to the metering valve 14.

Figure 2:
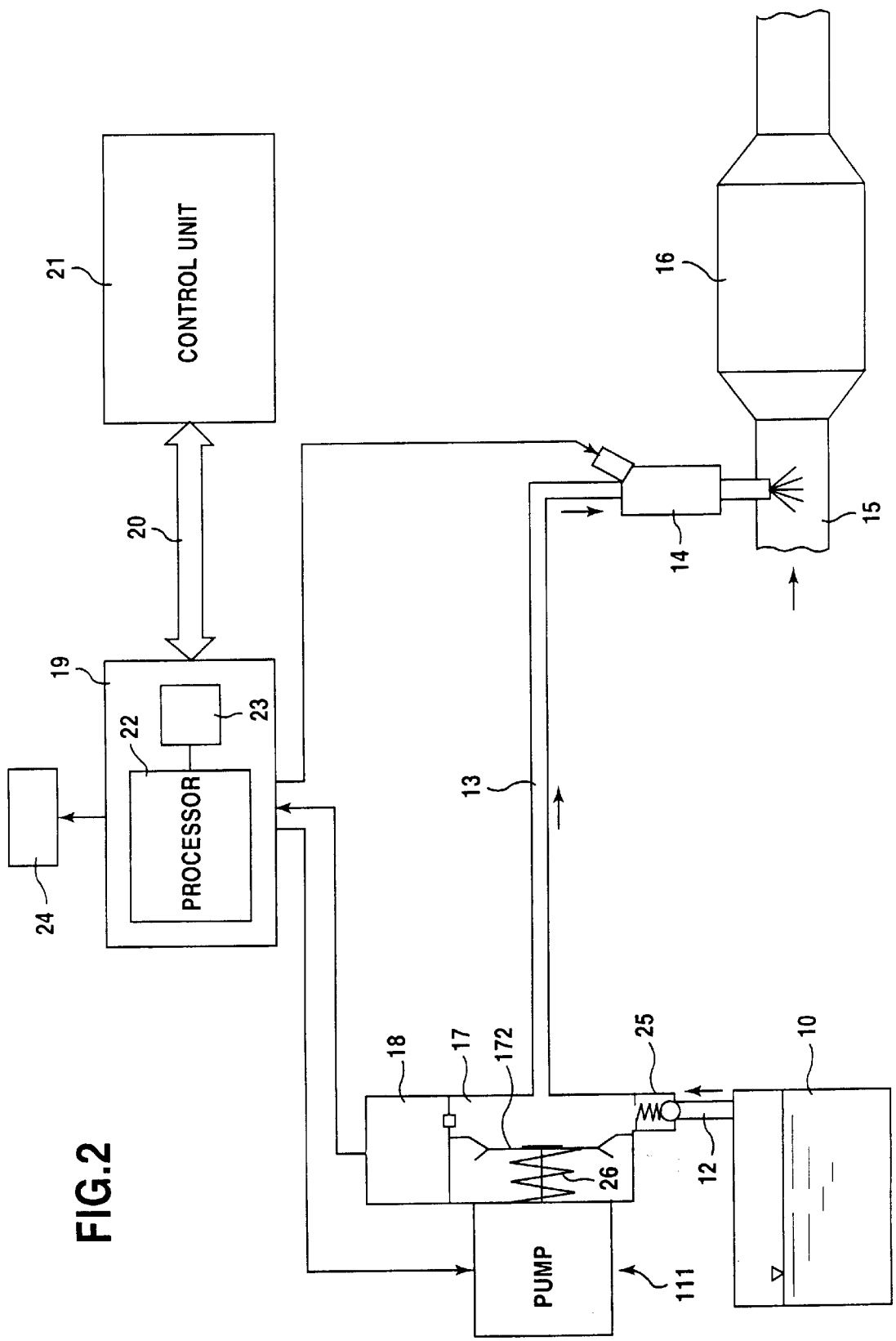
FIG. 2 is a block diagram of a second exemplary embodiment in which the pressure accumulator and the pump are integrated to form a single component.

Referring now to FIG. 2, there is shown a further illustrative embodiment of the system according to the invention, in which the pressure accumulator and the pump are integrated to a single unit.

The reference numeral 10 again denotes a reducing agent container, from which the reducing agent, for example urea dissolved in water, is delivered by means of an electrically driven diaphragm pump 111. For this purpose, the diaphragm pump 111 is connected via a delivery line 12 to the reducing agent container 10. Where the diaphragm pump 111 joins the delivery line 12, a nonreturn valve 25 is provided which lets the reducing agent through only in the direction indicated by an arrow symbol to a pressure accumulator directly connected to the diaphragm pump. The pressure sensor 18 is also integrated in the diaphragm pump 111 and thus measures the pressure in the pressure accumulator 17. From the pressure accumulator 17, a feedline 13 leads to a metering valve 14 which is arranged in an exhaust pipe 15, upstream of an SCR catalyst 16 in the exhaust gas flow direction (arrow symbol), in such a way that its nozzle opening projects into the exhaust pipe 15.

The pressure sensor 18, the system driving the diaphragm pump 111 and the metering valve 14 are respectively connected via electrical lines (not indicated in further detail) to a control unit 19 which controls the addition of the reducing agent to the exhaust 15. For this purpose, the control unit 19 has an electronic computer unit 22 which also carries out error detection and diagnostic routines.

The control unit 19 is connected via a serial interface 20 (for example a CAN BUS) to a control unit 21 of the internal combustion engine and/or to other control units. Via this interface, data such as, for example, engine speed, control movement and boost air temperature are transmitted to the control unit 19. Further, the control unit 19 contains various functional units for driving the actuators (reducing agent heater, pump) and for evaluating the signals delivered by the sensors (fill level sensor, temperature of the reducing agent, pressure in the pressure accumulator or in the feedline). For this purpose, the control unit 19 has, amongst other things, a memory 23 which stores a plurality of characteristic curves or characteristics, as well as threshold values, whose significance will be explained in more detail.

In the second illustrative embodiment, using a diaphragm pump, there is the possibility of utilizing the diaphragm 172 both for the pressure accumulator function and for the pump function. The diaphragm 172 is acted on by a spring 26 in order to produce the system pressure. For the pumping process, the diaphragm is deflected by the system driving the diaphragm pump (electric motor) against the force of the spring 26. The deflection of the diaphragm 172 may, for example, be recorded with a mechanical displacement sensor or a switch, and transmitted as information to the control unit. The deflection is compared with a predetermined value, which is stored in the memory 23, and as soon as this value of the deflection is reached, a pressure is built up, by the spring force of the membrane 172, which is essentially determined by the spring characteristics, the deflection and the diaphragm area.

If the metering valve 14 is then driven using corresponding drive signals from the control unit 19, the pressure in the system decreases. The value for the pressure in the system is measured continuously using the pressure sensor 18 and compared with a minimum pressure value stored in the memory 23 of the control unit. It is preferable to use short pulses as drive signals in order to avoid cooling out the catalyst. If, after a plurality of such metering pulses, the pressure reaches the predetermined minimum value, the pump drive system is restarted and the diaphragm 172 is deflected against the spring 26.

It is also possible to start this process after a predetermined minimum deflection of the diaphragm 172 is reached, corresponding to a maximum relaxation of the spring 26, for example using the signal from a position switch, and this is suitable especially in the case of purely mechanically controlled pumps. It is possible to determine the metered quantity of reducing agent and detect errors in terms of sealing faults in the system in the same way as described with reference to the illustrative embodiment according to FIG. 1.

If the diaphragm pump has a position switch or another way of ascertaining the displacement, the displacement volume may be provided directly through the deflection of the diaphragm, by means of which either redundancy in determining the metered quantity is obtained, which can help with the self-diagnosis capacity and the metering accuracy, or else it is possible to do without the pressure sensor.

I claim:

1. A method of after-treating exhaust gas of an internal combustion engine operating with excess air, wherein nitrogen oxides in the exhaust gas are reduced by selective catalytic reduction, which comprises:

pumping a liquid reducing agent from a reducing agent container into a pressure accumulator;

delivering, during specific operating states of an internal combustion engine, quantities of the reducing agent to an exhaust gas of the internal combustion engine upstream of an SCR catalyst, by opening a metering device and taking a quantity of reducing agent currently required for exhaust gas after-treatment from the pressure accumulator; and wherein the pumping step comprises delivering only a quantity of the reducing agent required by the metering to the pressure accumulator.

2. The method according to claim 1, wherein the pumping step comprises delivering the reducing agent with a pump.

3. The method according to claim 1, which further comprises recording a pressure in the pressure accumulator with a pressure sensor and determining a metered amount of reducing agent from a pressure difference before and after a respective metering phase.

4. The method according to claim 3, wherein the determining step comprises evaluating the metered amount of reducing agent from a characteristic curve in dependence on the measured pressure values.

5. The method according to claim 4, wherein the characteristic curve is stored in a memory of a control unit for exhaust gas after-treatment.

6. The method according to claim 1, which comprises checking the metering system for leak tightness during pauses between metering, in which no reducing agent is added.

7. The method according to claim 6, which comprises, after an end of a metering pulse, recording a pressure in the pressure accumulator, and, after a predetermined period of time has elapsed, determining whether the pressure in the pressure accumulator has fallen below a predetermined limit value, and if the pressure has fallen below the limit value, classifying the metering system as non-leaktight.

8. The method according to claim 2, which comprises sensing a pressure in the pressure accumulator with a pressure sensor, and, when the pressure falls below a lower pressure threshold value, turning the pump on, and when the pressure exceeds an upper pressure threshold value, turning the pump off.

9. The method according to claim 8, which comprises measuring a drive time of the pump during which the pressure lies between the lower and upper pressure threshold values and using the drive time as a criterion for a functionality of the pump.

10. The method according to claim 8, which comprises measuring a charging and discharging time of the pressure accumulator and using the charging and discharging time as a criterion for a functionality of the pressure accumulator.

11. The method according to claim 1, which comprises using a flexible line connecting the pump to the metering device as the pressure accumulator.

12. The method according to claim 1, wherein the internal combustion engine is a diesel internal combustion engine.

13. An exhaust gas after-treatment device for an internal combustion engine operating with excess air, wherein nitrogen oxides in the exhaust gas are reduced by selective catalytic reduction, comprising:

a reducing agent container;

a metering device for controlled feeding of a reducing agent to an exhaust gas of an internal combustion engine upstream of an SCR catalyst in an exhaust gas flow direction;

a pump communicating with said reducing agent container for pumping reducing agent from said reducing agent container; and a pressure accumulator in form of a flexible line connected between said pump and said metering device for intermediately storing the reducing agent, and a pressure sensor operatively associated with said pressure accumulator.

14. The device according to claim 13, wherein said internal combustion engine is a diesel internal combustion engine.

* * * * *